(No Model.)

G. BRYANT.
MACHINE FOR GROOVING BOOT OR SHOE SOLES.

No. 568,892. Patented Oct. 6, 1896.

Witnesses,
Inventor,
George Bryant
By Dewey & Co. Atty

UNITED STATES PATENT OFFICE.

GEORGE BRYANT, OF SAN FRANCISCO, CALIFORNIA, ASSIGNOR TO ALICE ELIZABETH BRYANT, OF SAME PLACE.

MACHINE FOR GROOVING BOOT OR SHOE SOLES.

SPECIFICATION forming part of Letters Patent No. 568,892, dated October 6, 1896.

Application filed May 20, 1896. Serial No. 592,282. (No model.)

*To all whom it may concern:*

Be it known that I, GEORGE BRYANT, a citizen of the United States, residing in the city and county of San Francisco, State of California, have invented an Improvement in Machines for Grooving Boot or Shoe Soles; and I hereby declare the following to be a full, clear, and exact description of the same.

My invention relates to a machine which is especially designed to form transverse grooves in the leather of which the soles of boots and shoes are to be formed for the purpose of rendering said soles pliable, while retaining a sufficient thickness of leather to render them moisture-resisting and to give good wearing qualities.

The invention consists in details of construction which will be more fully explained by reference to the accompanying drawings, in which—

Figure 1:
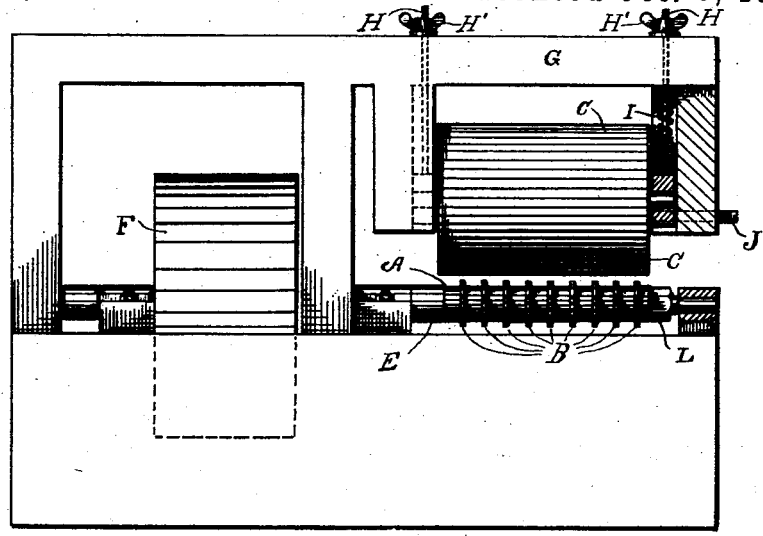
Figure 4:
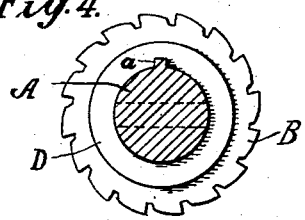
Figure 5:
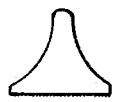
Figure 2:
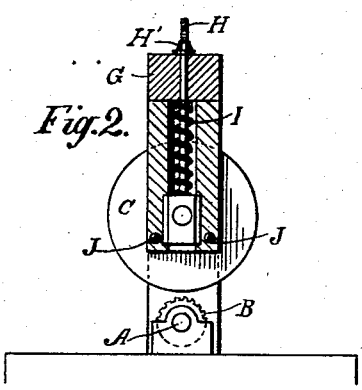
Figure 6:
Figure 3:
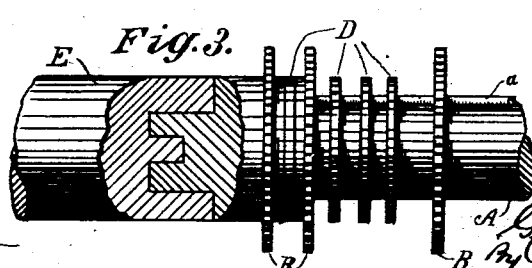

Figure 1 is a sectional elevation showing my apparatus. Fig. 2 is an end view of the same. Fig. 3 is an enlarged view of the saw-arbor with saws separated. Fig. 4 is an enlarged end view of same. Figs. 5 and 6 are modifications of the presser.

The object of my invention is to provide a simple, easily-adjusted, and rapidly-operating apparatus through which the leather soles may be passed at great speed, with means for easily regulating the depth of the cut, the tension of the pressure-roller, and the adjustment of the saws or cutters.

The apparatus may be mounted upon a table or bench or any suitable structure, and consists of an arbor A, adapted to carry the saws or cutters B, and means for rotating the saws, and a pressure-roller C, which is adjustably supported above the saws.

The saw-arbor has a feather $a$ formed upon it, and the saws have holes made centrally through them to fit the arbor with keyways which will fit the key or feather of the arbor when the saws are slipped into place.

The saws are separated by washers or collars D, which may be made of any suitable or desired thickness, either singly, or a series may be introduced between the saws to separate them as far as it may be desired to have the grooves in the leather separated.

One end of the saw-arbor is formed with a tongue which enters a corresponding slot in the end of the driving-shaft E, which shaft is properly journaled in line with the saw-arbor and has fixed upon it a driving-pulley F, through which power may be applied to rotate the saw-arbor. The opposite end of the arbor is supported in a journal-box in line with those of the driving-shaft, so that power applied to the latter will rotate the saws. The connection of the saw-arbor with the driving-shaft allows the arbor and saws to be removed by lifting the cap from the outer journal-box.

The saws may be loosely slipped upon the arbor without reference to the position of the teeth and are separated from each other by the collars or washers, the whole being secured in place by a nut L, which screws upon the arbor interior to the journal-box, in which its outer end turns. As this part of the apparatus is located above the table and independent thereof there is no necessity of particular adjustments of the saws, as there is no danger of their striking any part of the table or support.

Above the saws and journaled in a suitably-fixed frame G is the corrugated pressure-roller C. This roller turns freely in either direction between the sides of the frame G, and its journal-boxes are vertically movable in guides within the frame and are suspended by screw-threaded rods H from above and adjusting-nuts H'.

Springs I are fitted between the upper timber of the frame and the journal-boxes, these springs being of as great stiffness as may be necessary, so that they constantly press upon the journal-boxes and retain them at the lowest point.

If it is desired to raise the roller, it is done by turning the nuts H' upon the upper ends of the suspending-rods, so as to draw the latter and the journal-boxes of the roller upward, compressing the springs I at the same time.

If the roller is to be depressed, it is only necessary to turn the nuts H' in the opposite direction, when the springs I will act to force the rods and journal-boxes down, carrying the roller with them, so that it may be brought as near to the tops of the rotating cutters as may be desired.

The distance between the roller and the points of the cutter-teeth represents the thickness of the leather from the bottoms of the grooves or channels cut in it to the opposite side, and it will be plain that this thickness may be increased or diminished by the regulation of the roll, between which and the cutters the leather is caused to pass.

The tension of the roller is increased or diminished at will by means of screws J, which pass through the suspending-frame timbers and bear frictionally against the roller, either directly, as by its ends engaging the roller, or through the intervention of a plate or frictional surface of any well-known description.

The operation will then be as follows: The saw-arbor being driven at a high rate of speed by means of the driving mechanism, the soles to be grooved are delivered between the roller and the rotating cutters. The action of these cutters, in addition to forming the grooves in the leather, will be to drag the latter in the direction in which the cutters are revolving, and the resistance produced by the tension upon the roller causes the leather to move enough slower than the movement of the cutter-teeth so that the latter will form the desired grooves in the leather while it is passing between the two. By this simple arrangement I am enabled to effectively pass the leather between the cutters and the pressure-roll to regulate the depth of the grooves which are made in the leather.

It will be seen that the pressure-roller is an idler, turnable in either direction, and that by reversing the position of the saws the machine may be run in either direction, as may be convenient.

While I have described the pressure device as a roller, I do not limit myself to the same, as other devices may be used. For instance, the flat plate of Fig. 5 or the segment of Fig. 6 may be substituted for the roller, said plates being without movement, as the movement of the saws is sufficient to drag the leather through.

Having thus described my invention, what I claim as new, and desire to secure by Letters Patent, is—

1. An apparatus for grooving leather, consisting of a gang of circular saws or cutters, an arbor upon which said saws are fixed, a mechanism by which said arbor is rotated, a roller, the journal-boxes of which are supported in line above the saw-arbor and means whereby the rotation of the roller is regulated to retard the movement of the leather and allow the cutters to act upon it.

2. A device for cutting grooves upon the surface of leather, consisting of a gang of saws adjustably attached to an arbor, and a mechanism by which the arbor is rotated, a corrugated roller, the journal-boxes of which are vertically movable in guides above the saw-arbor, vertical suspending-rods extending upwardly from the journal-boxes, with screw-threaded upper ends and nuts turnable thereon, whereby the suspending-rods may be lengthened or shortened, springs acting to force the boxes downward when the nuts are turned to allow the rods to be lengthened and means for retarding the rotation of the roller and causing the material to move at a rate of speed less rapid than that of the cutters.

3. An apparatus for grooving boot and shoe soles consisting of a gang of saws adjustably fixed upon a saw-arbor, mechanism by which the saws and arbor are rotated, a corrugated roller, the shaft of which is journaled in vertically-adjustable boxes above the cutters, whereby the material to be grooved is passed between the roller and the cutters, and tension-screws adapted to press against the rollers so as to retard its rotation and thus cause the material to move at a rate of speed less rapid than that of the cutters.

4. A device for grooving leather for boot and shoe soles consisting of a saw-arbor having a feather, saws having central holes fitting the arbor and keyways adapted to slip over the feather whereby the saws are caused to rotate with the arbor, collars having corresponding holes and keyways fitting the arbor between the saws whereby the distance between the latter is regulated and maintained, a nut screwing upon the outer end of the arbor to lock the saws and collars in place, a driving-shaft journaled in line with the saw-arbor, the meeting ends of the two having a locking tongue and slot whereby the arbor is removably connected with the driving-shaft, a vertically-adjustable horizontally-rotatable roller journaled above the saw-arbor and tension-screws adapted to press against the end of the roller to retard its rotation, and the movement of the material to be grooved between it and the saws or cutters.

In witness whereof I have hereunto set my hand.

GEORGE BRYANT.

Witnesses:
S. H. NOURSE,
JESSIE C. BRODIE.